(12) United States Patent
Phillips

(10) Patent No.: US 11,347,798 B2
(45) Date of Patent: May 31, 2022

(54) DYNAMICALLY-QUALIFIED AGGREGATE RELATIONSHIP SYSTEM IN GENEALOGICAL DATABASES

(71) Applicant: Ancestry.com Operations Inc., Lehi, UT (US)

(72) Inventor: Jeff Phillips, Lehi, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 573 days.

(21) Appl. No.: 15/393,665

(22) Filed: Dec. 29, 2016

(65) Prior Publication Data

US 2018/0189379 A1 Jul. 5, 2018

(51) Int. Cl.
*G06F 16/901* (2019.01)
*G06F 16/28* (2019.01)

(52) U.S. Cl.
CPC ........ *G06F 16/9027* (2019.01); *G06F 16/285* (2019.01)

(58) Field of Classification Search
CPC ...... G06F 16/353; G06F 16/00; G06F 16/285; G06F 16/9027; G16B 20/00
See application file for complete search history.

(56) References Cited

U.S. PATENT DOCUMENTS

| | | | |
|---|---|---|---|
| 9,116,882 B1* | 8/2015 | Macpherson | G16B 40/00 |
| 2004/0189691 A1* | 9/2004 | Jojic | G11B 27/005 |
| | | | 715/720 |
| 2005/0147947 A1* | 7/2005 | Cookson | G06F 16/20 |
| | | | 434/154 |
| 2007/0266003 A1* | 11/2007 | Wong | G06Q 90/00 |
| 2014/0278138 A1* | 9/2014 | Barber | G09B 19/0046 |
| | | | 702/19 |
| 2016/0048517 A1* | 2/2016 | Jensen | G06F 16/2457 |
| | | | 707/749 |
| 2017/0213127 A1* | 7/2017 | Duncan | G16B 50/00 |
| 2017/0293861 A1* | 10/2017 | Roy | G06F 16/00 |

* cited by examiner

*Primary Examiner* — Cheyne D Ly
(74) *Attorney, Agent, or Firm* — Kilpatrick Townsend & Stockton LLP

(57) ABSTRACT

Methods and systems for creating a cluster view person for genealogical studies. Methods may include obtaining a plurality of genealogical trees. Each of the genealogical trees may include a plurality of interconnected nodes representing individuals that are related to each other. Methods may also include identifying one or more of the genealogical trees that contain a similar individual. Whether two individuals are grouped may depend on similarity and/or quality thresholds. Methods may include creating an aggregate individual including each of the similar individuals in each of the identified genealogical trees. The aggregate individual may combine information from each of the similar individuals.

20 Claims, 12 Drawing Sheets

FIG. 4

Tree Person A15
  (Score: 500, Quality: 700)
  John Doe
  Male
  Birth: 1/1/1900 SLC, UT
  Death: 1/1/1950 SLC, UT

Tree Person B13
  (Score: 900, Quality: 300)
  Jonathan Doe
  Male
  Birth: 1/1/1900 SLC, UT
  Death: 1/1/1951 SLC, UT

Tree Person C5
  (Score: 800, Quality: 100)
  Johnny Doe
  Male
  Birth: 1/1/1900 SLC, UT
  Death: 1/1/1951 SLC, UT

Tree Person D45
  (Score: 400, Quality: 700)
  John Doe
  Male
  Birth: 1/1/1900 SLC, UT
  Death: 1/1/1950 SLC, UT

Tree Person E135
  (Score: 150, Quality: 150)
  Jonny Doe
  Male
  Birth: 1/1/1900 SLC, UT
  Death: 1/1/1952 SLC, UT

Tree Person F287
  (Score: 650, Quality: 500)
  Jonathan Doe
  Male
  Birth: 1/1/1900 SLC, UT
  Death: 1/1/1952 SLC, UT 502a FILTERS:
Score ≥ 100
Quality ≥ 100

504a

Cluster View Person 1000
John Doe
  Contributor: Tree Person A15
  Contributor: Tree Person D45
Jonathan Doe
  Contributor: Tree Person B13
  Contributor: Tree Person F287
Johnny Doe
  Contributor: Tree Person C5
Jonny Doe
  Contributor: Tree Person E135
Male
  Contributor: Tree Person A15
  Contributor: Tree Person B13
  Contributor: Tree Person C5
  Contributor: Tree Person D45
  Contributor: Tree Person E135
  Contributor: Tree Person F287
Birth: 1/1/1900 SLC, UT
  Contributor: Tree Person A15
  Contributor: Tree Person B13
  Contributor: Tree Person C5
  Contributor: Tree Person D45
  Contributor: Tree Person E135
  Contributor: Tree Person F287
Death: 1/1/1950 SLC, UT
  Contributor: Tree Person A15
  Contributor: Tree Person D45
Death: 1/1/1951 SLC, UT
  Contributor: Tree Person B13
  Contributor: Tree Person C5
Death: 1/1/1952 SLC, UT
  Contributor: Tree Person E135
  Contributor: Tree Person F287

FIG. 5A

Tree Person A15
 (Score: 500, Quality: 700)
 John Doe
 Male
 Birth: 1/1/1900 SLC, UT
 Death: 1/1/1950 SLC, UT Tree Person B13
 (Score: 900, Quality: 300)
 Jonathan Doe
 Male
 Birth: 1/1/1900 SLC, UT
 Death: 1/1/1951 SLC, UT ~~Tree Person C5
 (Score: 800, Quality: 100)
 Johnny Doe
 Male
 Birth: 1/1/1900 SLC, UT
 Death: 1/1/1951 SLC, UT~~

Tree Person D45
 (Score: 400, Quality: 700)
 John Doe
 Male
 Birth: 1/1/1900 SLC, UT
 Death: 1/1/1950 SLC, UT ~~Tree Person E135
 (Score: 150, Quality: 150)
 Jonny Doe
 Male
 Birth: 1/1/1900 SLC, UT
 Death: 1/1/1952 SLC, UT~~

Tree Person F287
 (Score: 650, Quality: 500)
 Jonathan Doe
 Male
 Birth: 1/1/1900 SLC, UT
 Death: 1/1/1952 SLC, UT 502b FILTERS:
Score ≥ 200
Quality ≥ 200

504b

Cluster View Person 1000
 John Doe
  Contributor: Tree Person A15
  Contributor: Tree Person D45
 Jonathan Doe
  Contributor: Tree Person B13
  Contributor: Tree Person F287
 ~~Johnny Doe~~
  ~~Contributor: Tree Person C5~~
 ~~Jonny Doe~~
  ~~Contributor: Tree Person E135~~
 Male
  Contributor: Tree Person A15
  Contributor: Tree Person B13
  ~~Contributor: Tree Person C5~~
  Contributor: Tree Person D45
  ~~Contributor: Tree Person E135~~
  Contributor: Tree Person F287
 Birth: 1/1/1900 SLC, UT
  Contributor: Tree Person A15
  Contributor: Tree Person B13
  ~~Contributor: Tree Person C5~~
  Contributor: Tree Person D45
  ~~Contributor: Tree Person E135~~
  Contributor: Tree Person F287
 Death: 1/1/1950 SLC, UT
  Contributor: Tree Person A15
  Contributor: Tree Person D45
 Death: 1/1/1951 SLC, UT
  Contributor: Tree Person B13
  ~~Contributor: Tree Person C5~~
 Death: 1/1/1952 SLC, UT
  ~~Contributor: Tree Person E135~~
  Contributor: Tree Person F287

FIG. 5B

Tree Person A15
  (Score: 500, Quality: 700)
  John Doe
  Male
  Birth: 1/1/1900 SLC, UT
  Death: 1/1/1950 SLC, UT ~~Tree Person B13~~
  ~~(Score: 900, Quality: 300)~~
  ~~Jonathan Doe~~
  ~~Male~~
  ~~Birth: 1/1/1900 SLC, UT~~
  ~~Death: 1/1/1951 SLC, UT~~

~~Tree Person C5~~
  ~~(Score: 800, Quality: 100)~~
  ~~Johnny Doe~~
  ~~Male~~
  ~~Birth: 1/1/1900 SLC, UT~~
  ~~Death: 1/1/1951 SLC, UT~~

~~Tree Person D45~~
  ~~(Score: 400, Quality: 700)~~
  ~~John Doe~~
  ~~Male~~
  ~~Birth: 1/1/1900 SLC, UT~~
  ~~Death: 1/1/1950 SLC, UT~~

~~Tree Person E135~~
  ~~(Score: 150, Quality: 150)~~
  ~~Jonny Doe~~
  ~~Male~~
  ~~Birth: 1/1/1900 SLC, UT~~
  ~~Death: 1/1/1952 SLC, UT~~

Tree Person F287
  (Score: 650, Quality: 500)
  Jonathan Doe
  Male
  Birth: 1/1/1900 SLC, UT
  Death: 1/1/1952 SLC, UT 502c FILTERS:
Score ≥ 500
Quality ≥ 500

504c

Cluster View Person 1000
John Doe
  Contributor: Tree Person A15
  ~~Contributor: Tree Person D45~~
Jonathan Doe
  ~~Contributor: Tree Person B13~~
  Contributor: Tree Person F287
~~Johnny Doe~~
  ~~Contributor: Tree Person C5~~
~~Jonny Doe~~
  ~~Contributor: Tree Person E135~~
Male
  Contributor: Tree Person A15
  ~~Contributor: Tree Person B13~~
  ~~Contributor: Tree Person C5~~
  ~~Contributor: Tree Person D45~~
  ~~Contributor: Tree Person E135~~
  Contributor: Tree Person F287
Birth: 1/1/1900 SLC, UT
  Contributor: Tree Person A15
  ~~Contributor: Tree Person B13~~
  ~~Contributor: Tree Person C5~~
  ~~Contributor: Tree Person D45~~
  ~~Contributor: Tree Person E135~~
  Contributor: Tree Person F287
Death: 1/1/1950 SLC, UT
  Contributor: Tree Person A15
  ~~Contributor: Tree Person D45~~
~~Death: 1/1/1951 SLC, UT~~
  ~~Contributor: Tree Person B13~~
  ~~Contributor: Tree Person C5~~
Death: 1/1/1952 SLC, UT
  ~~Contributor: Tree Person E135~~
  Contributor: Tree Person F287

FIG. 5C

| ITEM | SUB-ITEM | SCORE | QUALITY |
|---|---|---|---|
| Item A | | | |
| | Sub-Item 1 | 100 | 80 |
| | Sub-Item 2 | 90 | 75 |
| | Sub-Item 3 | 80 | 70 |
| | Sub-Item 4 | 70 | 80 |
| | Sub-Item 5 | 60 | 75 |
| | Sub-Item 6 | 50 | 70 |
| | Sub-Item 7 | 40 | 80 |
| Item B | | | |
| | Sub-Item 8 | 90 | 55 |
| | Sub-Item 9 | 90 | 40 |
| | Sub-Item 10 | 80 | 40 |
| | Sub-Item 11 | 80 | 55 |
| | Sub-Item 12 | 70 | 55 |
| | Sub-Item 13 | 70 | 40 |
| | Sub-Item 14 | 70 | 80 |

700

| ITEM | SUB-ITEM | SCORE | QUALITY |
|---|---|---|---|
| Item A | | | |
| | Sub-Item 1 | 100 | 80 |
| Item B | | | |
| | Sub-Item 8 | 90 | 55 |
| | Sub-Item 9 | 90 | 40 |
| | Sub-Item 10 | 80 | 40 |
| | Sub-Item 11 | 80 | 55 |
| | Sub-Item 14 | 70 | 80 |

900

DYNAMICALLY-QUALIFIED AGGREGATE RELATIONSHIP SYSTEM IN GENEALOGICAL DATABASES

BACKGROUND OF THE INVENTION

In certain genealogical or family history databases, ancestor data is stored in trees which contain one or more persons or individuals. Trees may also include intra-tree relationships which indicate the relationships between the various individuals within a certain tree. In many cases, persons in one tree may correspond to persons in other trees, as users have common ancestors with other users. One challenge in genealogical databases has been dealing with duplicate persons with data that do not perfectly align. This problem arises due to discrepancies between different historical records, discrepancies between historical records and human accounts, and discrepancies between different human accounts. For example, different users having a common ancestor may have different opinions as to the name, dates of birth, and place of birth of that ancestor. The problem becomes particularly prevalent when large amounts of historical documents are difficult to read, causing a wide range of possible personal information. Therefore, there is a need for improved techniques in the area.

BRIEF SUMMARY OF THE INVENTION

Embodiments of the present invention include a method for creating a cluster view person. The method may include obtaining a plurality of genealogical trees. In some embodiments, each of the plurality of genealogical trees includes a plurality of interconnected nodes representing individuals that are related to each other. The method may also include identifying one or more genealogical trees of the plurality of genealogical trees that contain a similar individual. In some embodiments, two different individuals in two different genealogical trees are determined to be similar based on a comparison between the two different individuals and a similarity threshold. Furthermore, the method may include creating an aggregate individual comprising each of the similar individuals in each of the identified genealogical trees. In some embodiments, the aggregate individual combines information from each of the similar individuals.

In some embodiments, the combined information from each of the similar individuals includes one or more of the following: a name, a gender, a date of birth, a location of birth, a date of death, and a location of death. The method may also include determining a statistic of the combined information from each of the similar individuals. The method may further include displaying, by a display device, the aggregate individual by displaying the statistic. In some embodiments, the method includes ranking the combined information from each of the similar individuals from most frequent to least frequent. In some embodiments, the similarity threshold is dynamically adjustable by an end user. In some embodiments, the similarity threshold is automatically adjusted by a processor.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 4 illustrates a cluster view person, according to an embodiment of the present disclosure.

FIGS. 5A-5C illustrate various cluster view persons with various filters, according to an embodiment of the present disclosure.

Figure 1:
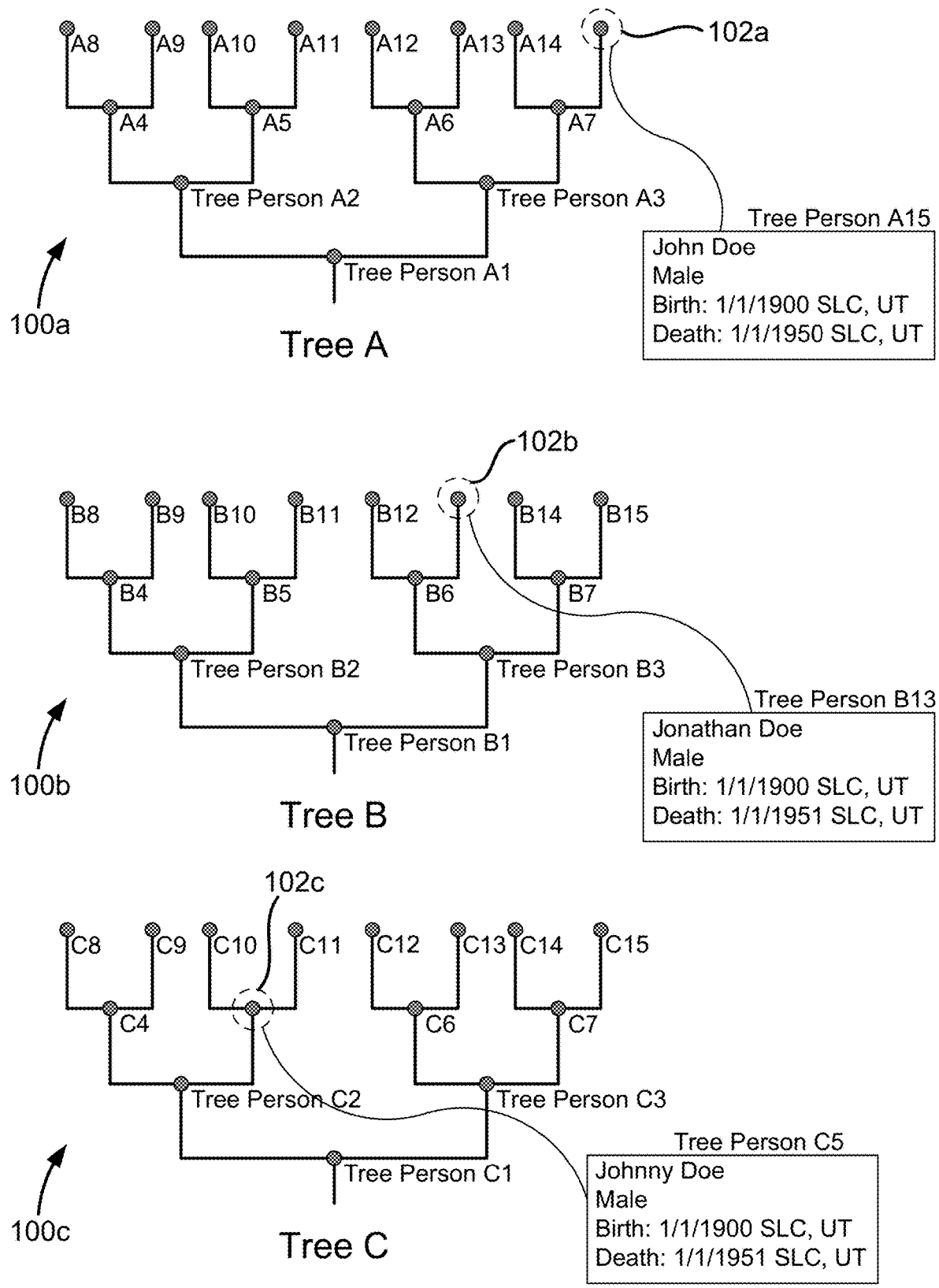
FIG. 1 illustrates various family trees having a similar individual, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Genealogical databases often contain huge amounts of information that include trees, persons, and intra-tree relationships among persons. Many trees contain persons that correspond to persons in other trees, as users have common ancestors with other users. The advantage of identifying these duplicate or corresponding persons is that one user may have information for their ancestor that another user does not. As more duplicate persons are identified, rather than list every duplicate person for the user to browse, it may be more helpful to show a user an aggregation of all the duplicates merged together in a single, concise view of the cluster (i.e., a group of duplicate persons).

Additionally, persons in a cluster have varying degrees of data quality/completeness, as well as similarity with other persons in the cluster. Users or external systems often have different preferences when utilizing an aggregate view of a cluster. Some prefer to have high-quality or high-similarity in their view (which limits the content viewable within a cluster). Others prefer to have a larger view of the cluster by allowing persons with less quality or lower similarity (which increases the content viewable within a cluster). Embodiments of the present disclosure allow users and external systems to specify the degree of similarity and/or quality they would like to allow in their view.

The present disclosure describes systems, methods, and other techniques for allowing users or external systems to utilize an aggregate view of a cluster (called a cluster view person), as well as customize their view according to similarity and/or quality thresholds. The present disclosure allows users to avoid browsing through thousands of individual tree persons of a cluster, which can be cumbersome and impractical, particularly for large clusters.

Definitions

As used herein, the terms "tree", "family tree", and "genealogical tree" may be used interchangeably and may refer to a finite number of related individuals that are interconnected in the tree according to their relationships. Two individuals that are directly connected in a tree may be in a parent-child relationship, in a sibling relationship, or in some other relationship. A tree may be displayed as various points connected by lines. The base or bottom of the tree may comprise a single individual, which may or may not be a user of the tree.

As used herein, the terms "tree person", "person", "individual", and "node" may be used interchangeably and may refer to a living or deceased human being that is represented in a tree.

As used herein, the term "user" may refer to an owner or creator of a tree, or may refer to any entity, human or non-human, that is currently using a tree or genealogical database in some manner.

As used herein, the term "cluster" may refer to a grouping of tree persons. Although clusters are designed to group various tree persons that correspond to the same actual human being, this is not always possible, and often clusters are either overinclusive or underinclusive based on some similarity threshold that is employed.

As used herein, the terms "cluster view person" and "aggregate individual" may be used interchangeably and may refer to an aggregate view of a cluster and/or may refer to a grouping of tree persons according to some similarity threshold and/or quality threshold. Unlike a cluster, a cluster view person does not necessarily attempt to aggregate all tree persons that correspond to the same actual human being. A user may desire to manipulate a cluster view person such that a smaller subset of tree persons are viewable in the cluster view person in a useful way. A cluster view person may differ from a cluster both in the way tree persons are selected (generally based on similarity and/or quality thresholds) and in the way the data derived from the tree persons is presented and viewed.

Dynamically-Qualified Aggregate Relationship System

FIG. 1 illustrates family trees 100a-c, each having similar individuals 102a-c, according to an embodiment of the present disclosure. Trees 100a-c are also denoted as Trees A, B, and C, respectively. Trees A, B, and C may be owned by, created by, and/or used by Tree Persons A1, B1, and C1, or by some other users unrelated to Trees A, B, and C. In some embodiments, it may be determined that Tree Person A15 (named "John Doe"), Tree Person B13 (named "Jonathan Doe"), and Tree Person C5 (named "Johnny Doe") correspond to the same person based on their similarity. Although a user of Tree A may understand Tree Person A15 to be John Doe, it may be beneficial to that user to become aware of the information discovered by the users of Trees B and C, who understand John Doe to in fact have a differently spelled name and a different date of death. Similarly, users of Trees B and C may benefit to know of alternate spellings and dates of death for Tree Persons B13 and C5, whom they understand to be Jonathan Doe and Johnny Doe. Therefore, to assist users of Trees A, B, and C in their genealogical research, it is often advantageous to group together similar tree persons into a cluster and/or a cluster view person.

Figure 2:
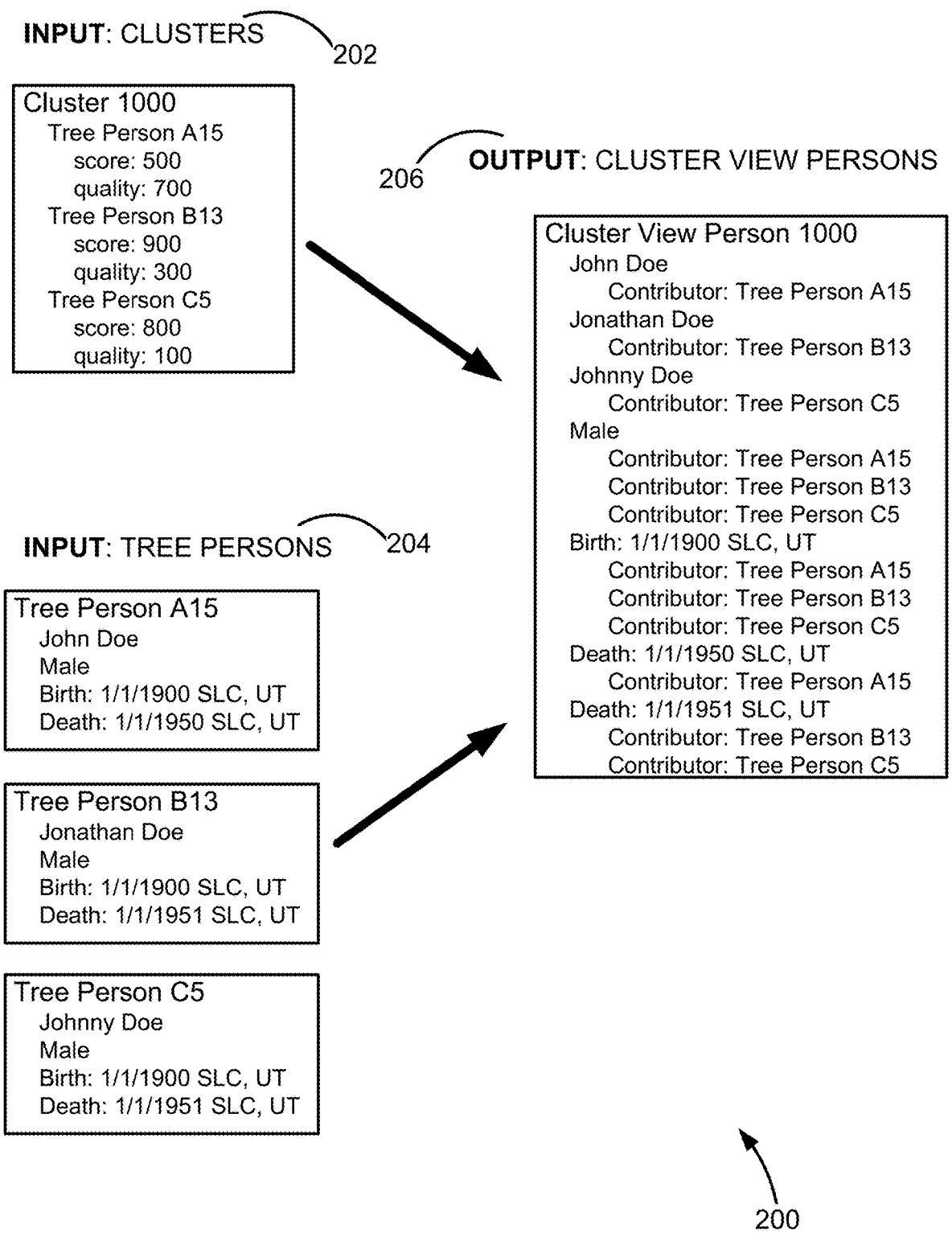
FIG. 2 illustrates a block diagram showing a relationship between clusters, tree persons, and cluster view persons, according to an embodiment of the present disclosure.

FIG. 2 illustrates a block diagram 200 showing a relationship between clusters 202, tree persons 204, and cluster view persons 206, according to an embodiment of the present disclosure. Clusters 202 and tree persons 204 may serve as inputs in the creation of a cluster view person. In some embodiments, each tree person in a cluster is numerically assigned a score and a quality. For example, in Cluster 1000, Tree Person A15 is assigned a score of 500 and a quality of 700, Tree Person B13 is assigned a score of 900 and a quality of 300, and Tree Person C5 is assigned a score of 800 and a quality of 100.

In some embodiments, the score of a tree person is the similarity between the tree person and the other tree persons in the cluster. For example, in some embodiments, a centroid (i.e., average position of all data points) is calculated for the combination of all the tree persons in a cluster, and the score for each tree person is inversely proportional to the distance between the tree person and the centroid. For example, a tree person that is closer to the centroid would have a higher score than a tree person that is further from the centroid.

In some embodiments, the quality of a tree person is related to the quantity and quality of the historical records and other evidence in support of the information contained in the tree person. The quality of a tree person may also be related to the completeness of the tree person, which is the amount of information defined for that tree person, e.g., name, date of birth, place of birth, and the like. While clusters may have a similarity threshold to determine which tree persons should be grouped together in a cluster, this similarity threshold is not necessarily equal to the similarity threshold for the cluster view person to determine which tree persons should be included in the cluster view person. The similarity threshold for the cluster view person may be higher, lower, or equal to the similarity threshold for a cluster. In some embodiments, cluster view persons 206 are not based on clusters 202 but rather are developed solely from tree persons 204.

Cluster View Person 1000 includes each of Tree Persons A15, B13, and C5 arranged in order of quality. For example, because Tree Person A15 has a higher quality than Tree Person B13, John Doe is displayed/listed above Jonathan Doe and the date of death of Jan. 1, 1950 is displayed/listed above Jan. 1, 1951. Similarly, because Tree Person B13 has a higher quality than Tree Person C5, Jonathan Doe is displayed above Johnny Doe. In other embodiments, tree persons may not be arranged in order of quality, but may be ordered in a number of different ways, including score and frequency (quantity of other tree persons with identical information).

Figure 3:
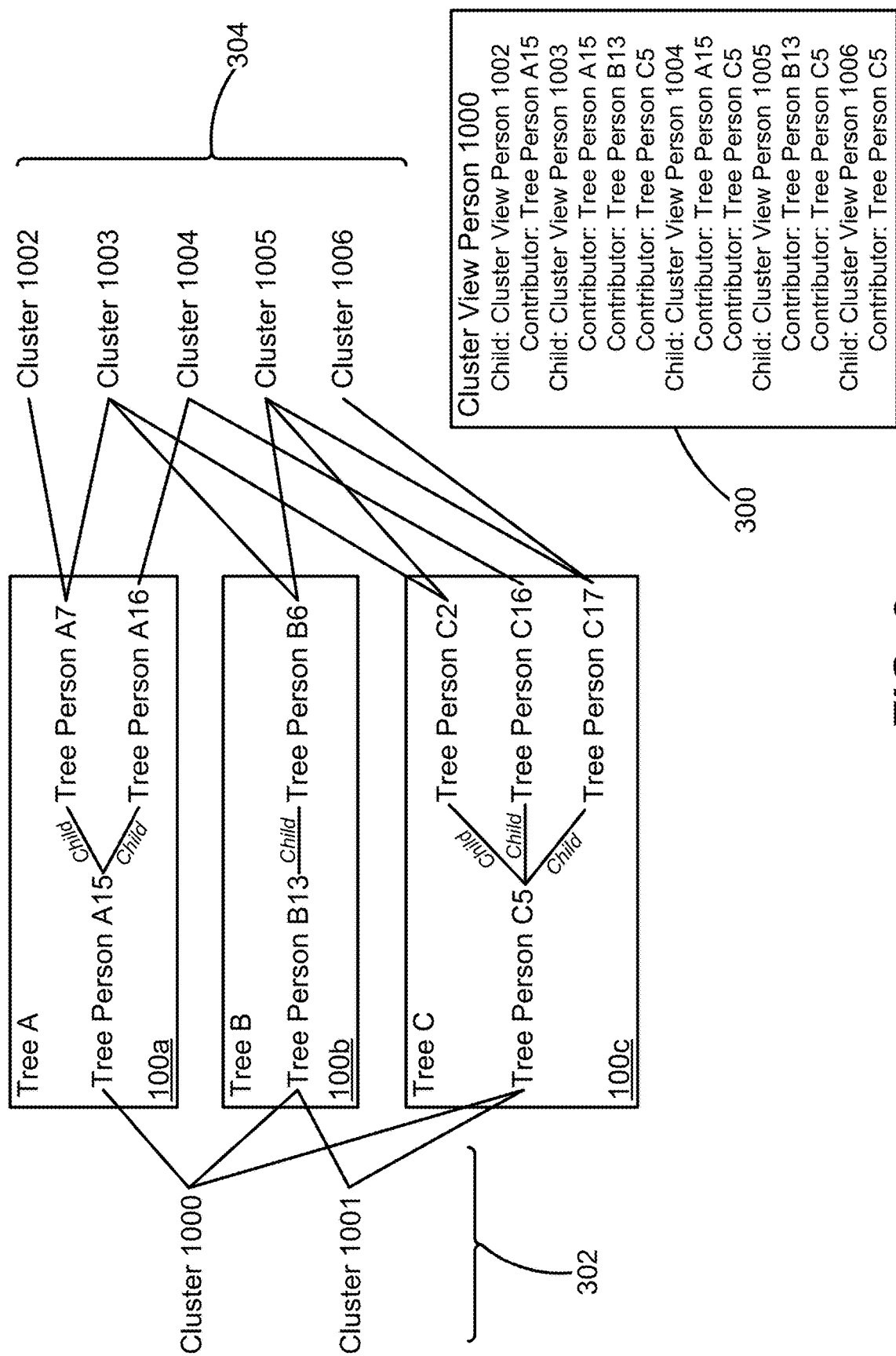
FIG. 3 illustrates a cluster view person, according to an embodiment of the present disclosure.

FIG. 3 illustrates a cluster view person 300 denoted as Cluster View Person 1000, according to an embodiment of the present disclosure. In some embodiments, a cluster view person may display its relatives in terms of other cluster view persons. For example, while Cluster View Person 1000 includes three tree persons (Tree Persons A15, B13, and C5), each of those tree persons may have children that are different. The children of Tree Persons A15, B13, and C5 may be grouped into different clusters, and each of those different clusters may comprise a cluster view person. For example, after parent clusters 302 and child clusters 304 are created, cluster view persons for each parent cluster may be created in terms of child clusters 304. Cluster View Person 1000 includes as children Cluster View Persons 1002, 1003, 1004, 1005, and 1006, and Cluster View Person 1001 (not shown) includes as children Cluster View Persons 1003, 1004, 1005, and 1006 (note that Cluster 1002 does not include any tree persons from Tree B or Tree C). Parent clusters 302 and child clusters 304 may be dependent on the similarity threshold selected, and may therefore modify Cluster View Person 1000 as the threshold is changed.

Figure 4:
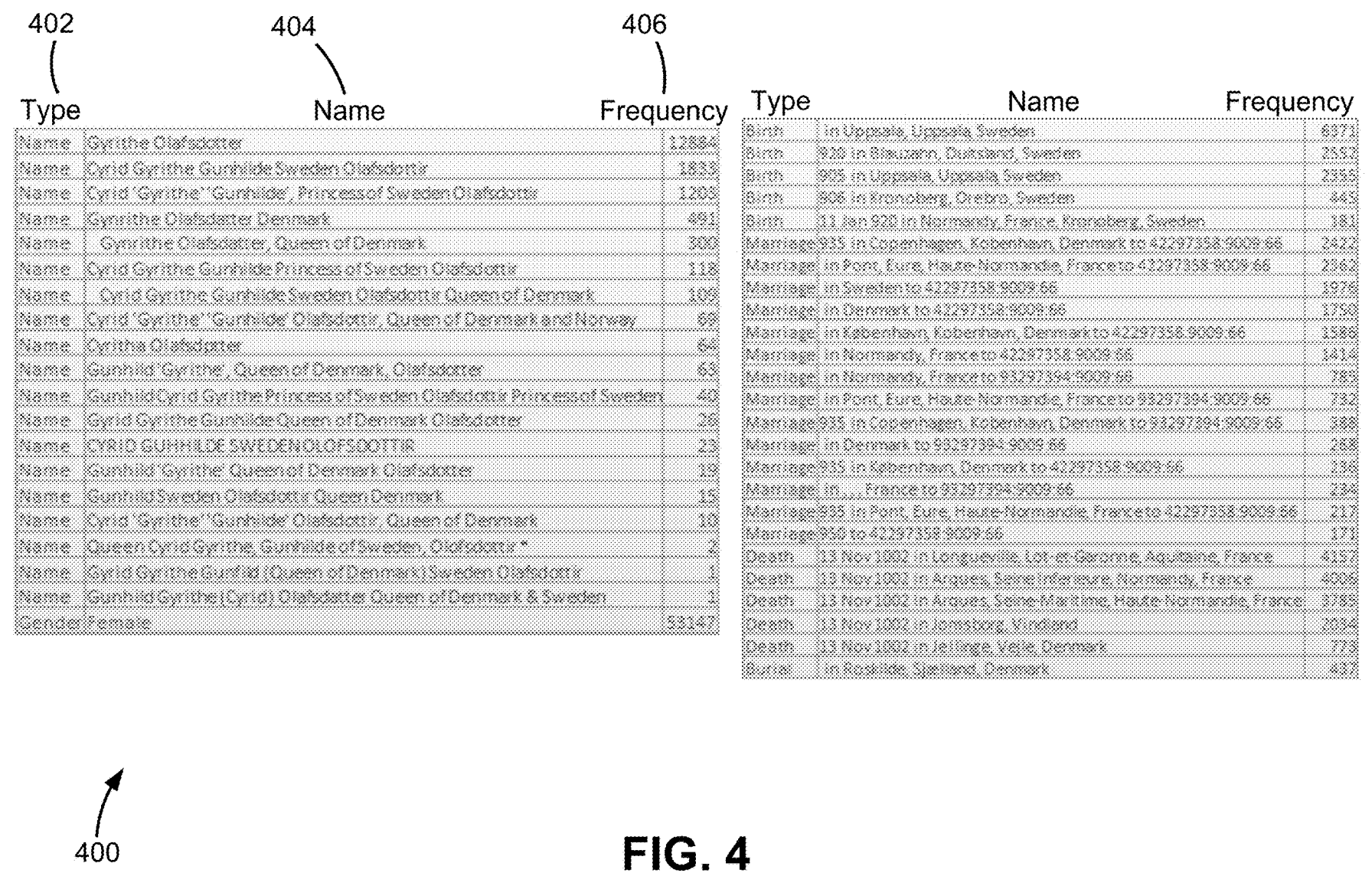

FIG. 4 illustrates a cluster view person 400, according to an embodiment of the present disclosure. Cluster view person 400 is displayed according to type 402, name 404, and frequency 406. Certain statistics may be computed and displayed within a cluster view person. For example, a frequency 406 may be computed for the number of tree persons that include a certain type 402 and name 404. In cluster view person 400, the name "Gyrithe Olafsdotter" appears in 12,884 tree persons while other names appear significantly less. Cluster view persons that display statistics may facilitate a user in better understanding and visualizing amounts of genealogical information.

FIGS. 5A-5C demonstrate how a user may specify a wide range of filters to modify a cluster view person, according to various embodiments of the present disclosure. In FIG. 5A, a user may decide that they want to view a large number of possible versions (tree persons) of the ancestor they are researching. The user may specify filter 504a to indicate that only tree persons with scores equal to or greater than 100 and qualities equal to or greater than 100 be used, causing all of tree persons 502a to be included in Cluster View Person 1000.

In FIG. 5B, a user may decide that they want to view a moderate number of possible versions of the ancestor they are researching. The user may specify filter 504b to indicate that only tree persons with scores equal to or greater than 200 and qualities equal to or greater than 200 be used. Filter 504b causes Tree Person C5 (quality not greater than 200) and Tree Person E135 (both quality and score not greater than 200) to be excluded from Cluster View Person 1000. The remaining tree persons from tree persons 502b are included in Cluster View Person 1000.

In FIG. 5C, a user may decide that they want to view a low number of possible versions of the ancestor they are researching. The user may specify filter 504c to indicate that only tree persons with scores equal to or greater than 500 and qualities equal to or greater than 500 be used. Filter 504c causes Tree Persons B13, C5, D45, and E135 to be excluded from Cluster View Person 1000. The remaining tree persons from tree persons 502c, Tree Persons A15 and F287, are included in Cluster View Person 1000.

The cluster view person may dynamically scale as the selected filter changes and/or as changes occur within a genealogical database. For example, in some embodiments a user may use a slider input to dynamically change a filter setting over a continuous range and watch the cluster view person automatically adjust in real time to the changes. In some embodiments, a first user may observe a cluster view person dynamically change as a second user modifies a tree person that is included in the cluster view person. In some genealogical databases, a system called the "Stitch System" may be tasked with identifying similar tree persons to define clusters. As changes occur for tree persons, such as the spelling of a name or the addition of a relationship, the clusters that the tree person is a member of are identified and the cluster view person is updated. Similarly, as tree persons are added or removed from clusters, the cluster view person is updated.

When a user requests a cluster view person, they may specify the minimum score (similarity) and quality of the tree persons allowed in the view. In some embodiments, to produce this view, a copy of the cluster view person is read from a database and all tree persons that do not meet the specified similarity and quality criteria are disassociated from the attributes they contributed to the cluster view person. Then, all attributes that do not have any remaining associations with tree persons are removed as they were contributed only by tree persons that did not meet the user's criteria.

Figure 6:
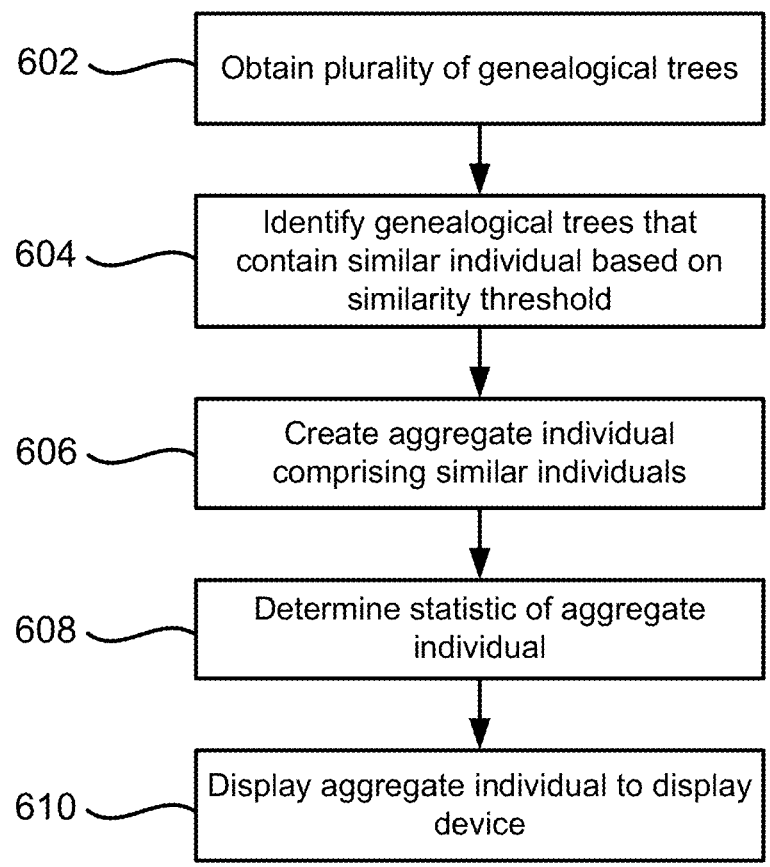
FIG. 6 illustrates a process for creating a cluster view person, according to an embodiment of the present disclosure.

FIG. 6 illustrates a process for creating a cluster view person, according to an embodiment of the present disclosure. At step 602, a plurality of genealogical trees are obtained. At step 604, genealogical trees that contain a similar individual are identified. Two different individuals in two different genealogical trees are determined to be similar based on a comparison between the two different individuals and a similarity threshold. For example, in some embodiments, a similarity threshold may be such that two different individuals are determined to be similar when they have the same date of birth and the same date of death, regardless of their names. In other embodiments, a similarity threshold may be such that two different individuals are determined to be similar when they have 90% of the letters of both their first names and last names in common and at least a date of birth in common or a date of death in common. In other embodiments, a similarity threshold may be such that two different individuals are determined to be similar when they have 90% of the letters of both their first names and last names in common and at least one other direct relative with 90% of the letters of both their first names and last names in common.

In some embodiments, the determination that two individuals are similar may also be based on a quality threshold. For example, although a certain tree person may be identical to another tree person in another tree, if the certain tree person has very few historical records and other evidence in support of it, a user may specify a quality threshold such that the two tree persons are not determined to be similar. For example, in some embodiments, a quality threshold may be such that two different individuals are not determined to be similar when one of them has less than 10 historical records in support of it. In other embodiments, a quality threshold may be such that two different individuals are not determined to be similar when one of them has only one type of historical record in support of it, such as census data.

At step 606, an aggregate individual comprising each of the similar individuals is created. The aggregate individual may be similar or identical to the cluster view persons described herein. In some embodiments, the creation of the aggregate individual includes applying a view filter to a cluster such that tree persons within the cluster are aggregated according to the threshold and/or filter in place. In some embodiments, the creation of the aggregate individual includes the creation of a new data structure that is entirely different from the cluster.

At step 608, a statistic of the combined information from each of the similar individuals is determined. The statistic may include the frequency of each information in different tree persons, or may include more advanced calculations such as probabilities. At step 610, the aggregate individual may be displayed to a display device. In some embodiments, the aggregate individual is displayed by displaying the statistic. The statistic may be displayed by outputting a graph, chart, table, and/or list to the display device. For example, a histogram of the possible names for an individual may be outputted to the display device.

Optimized Index Storage

In order for genealogical databases to allow users to search through huge numbers of trees and tree persons for ancestors that meet specified similarity and quality thresholds, faster and more efficient searching techniques are needed. Usage of an optimized index storage may increase speeds for an end user and decrease the overall burden on the database.

More specifically, in data-querying scenarios where a result is excluded or returned based on whether any subordinate items meet or exceed a combination of quantitatively-compared criteria, the time to traverse a large set of subordinate items for each potential result can be unacceptably slow, or the storage space required to keep all subordinate items available for query-traversal, whether on physical disk or in memory, can be unaffordable. The optimized index storage described below reduces the storage requirements and improves the performance of these queries.

Figure 7:
FIG. 7 illustrates a data set, according to an embodiment of the present disclosure.

FIG. 7 illustrates a data set 700, according to an embodiment of the present disclosure. Data set 700 includes Item A with Sub-Items 1-7 and Item B with Sub-Items 8-14. Each sub-item has a specified score and quality. When a query is made for items that have any sub-item with a score greater than 79 and a quality greater than 59, the query would return Item A but not Item B. An index may be created to support this query and queries similar to it by storing only the logically necessary sub-items for each item.

Figure 8:
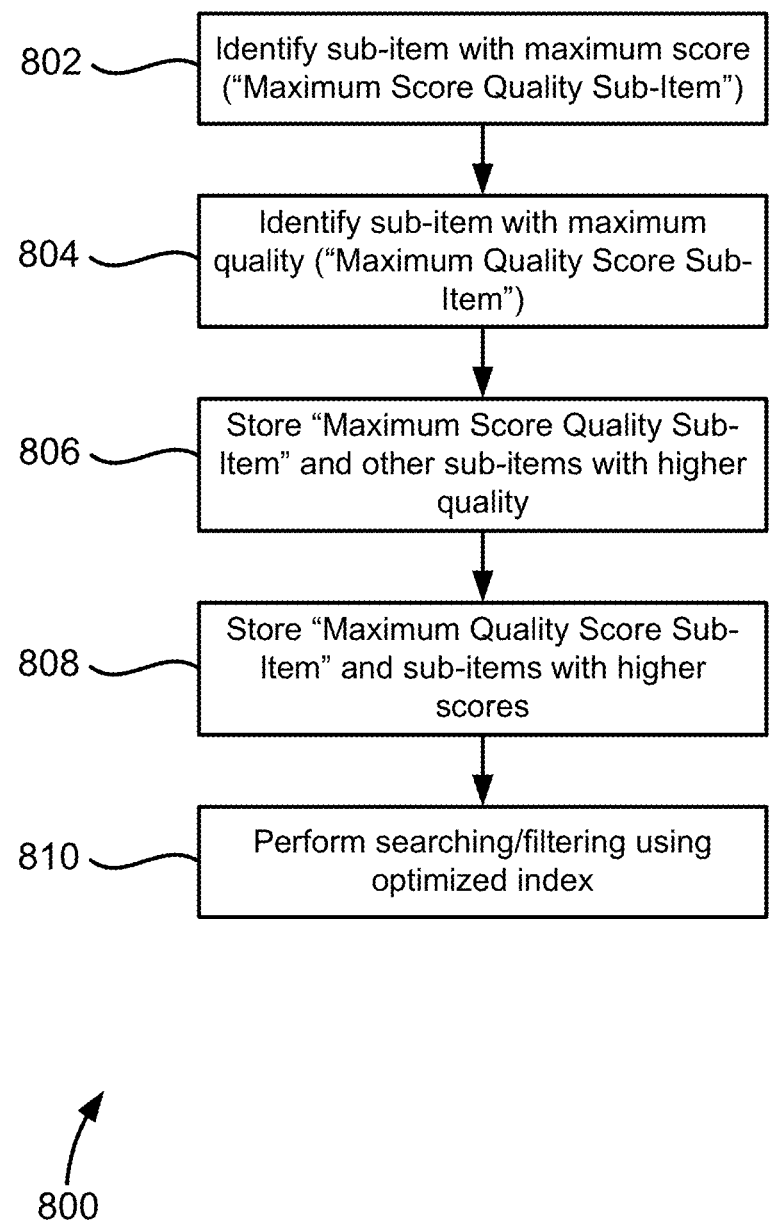
FIG. 8 illustrates a process for creating an optimized index, according to an embodiment of the present disclosure.

FIG. 8 illustrates a process 800 for creating an optimized index, according to an embodiment of the present disclosure. At step 802, the sub-item with the maximum score is identified. If there are multiple sub-items with the same maximum score, then the one with the highest quality is used. This sub-item is called the "Maximum Score Quality Sub-Item" of the item. The "Maximum Score Quality Sub-Item" for Item A is Sub-Item 1 and for Item B is Sub-Item 8.

At step 804, the sub-item with the maximum quality is identified. If there are multiple sub-items with the same maximum quality, then the one with the highest score is used. This sub-item is called the "Maximum Quality Score Sub-Item" of the item. The "Maximum Quality Score Sub-Item" for Item A is Sub-Item 1 and for Item B is Sub-Item 14.

At step 806, the sub-item that is the "Maximum Score Quality Sub-Item" is stored along with any other sub-items that have a higher quality than the "Maximum Score Quality Sub-Item". At step 808, the sub-item that is the "Maximum Quality Score Sub-Item" is stored along with any other sub-items that have a higher score than the "Maximum Quality Score Sub-Item". At step 810, searching and/or filtering is performed using the optimized index instead of the original data set.

Figure 9:
FIG. 9 illustrates an optimized index, according to an embodiment of the present disclosure.

FIG. 9 illustrates an optimized index 900, according to an embodiment of the present disclosure. Performance of process 800 on data set 700 yields optimized index 900, containing Sub-Items 1, 8, 9, 10, 11, and 14. Sub-Items 1 and 8 were stored because they were the "Maximum Score Quality Sub-Item" for Items A and B, respectively. Sub-Item 14 was stored because it was the "Maximum Quality Score Sub-Item" for Item A. Sub-Items 9, 10, and 11 were stored because they had higher scores than Sub-Item 14.

With optimized index 900, queries can be performed against a smaller set of data and can yield the same results as if they were performed against all the values in the original data set. This technique also applies to data sets with more than two quantitatively-compared fields. For example, data sets may have more than two quantitative attributes on a single sub-item, such as score, quality, and completeness. Furthermore, data sets comprising items with sub-items, sub-sub-items, and sub-sub-sub-items (etc.) can be simplified into an optimized index using a process similar to process 800.

Simplified Computer System

Figure 10:
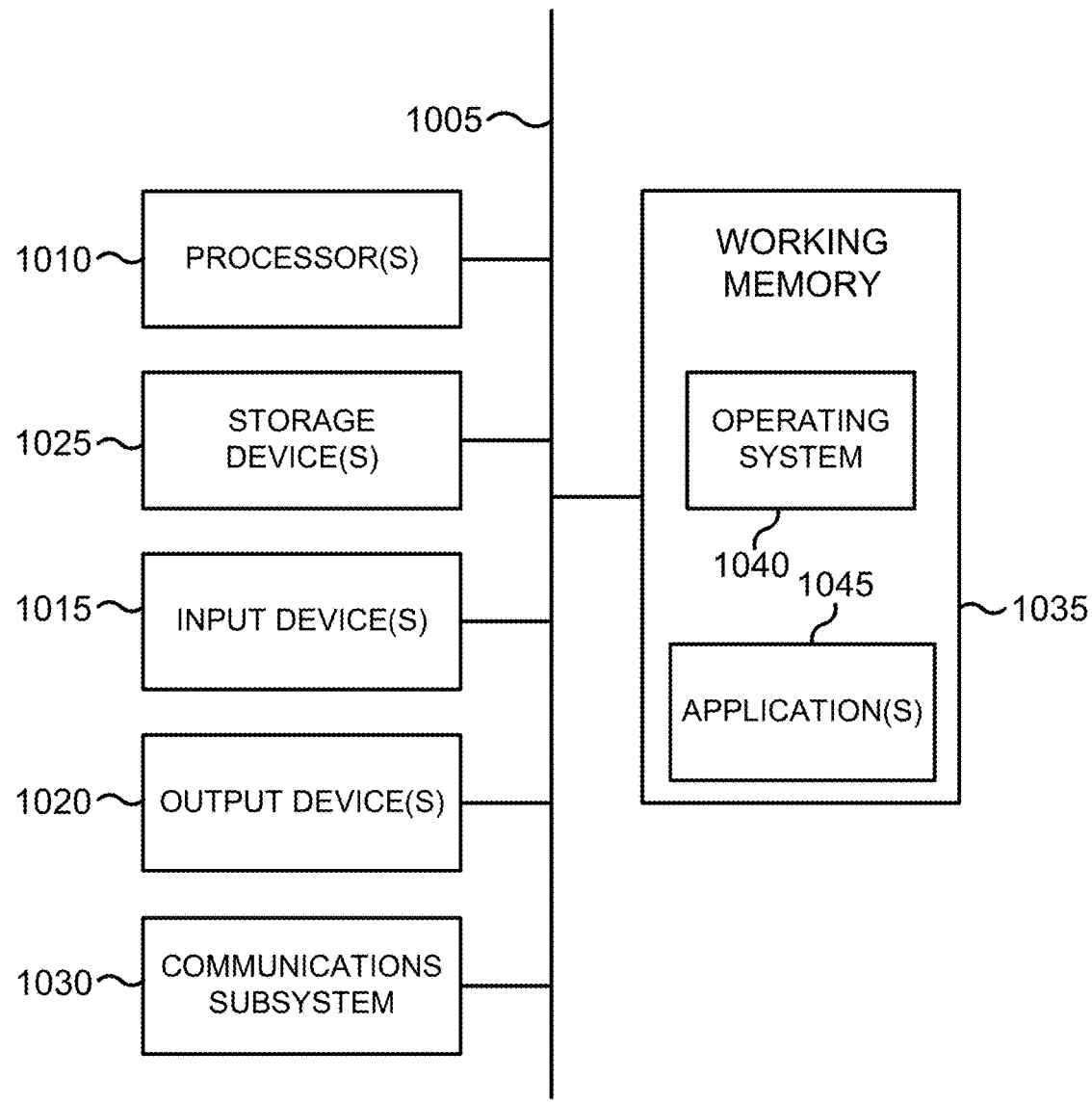
FIG. 10 illustrates a simplified computer system, according to an embodiment of the present disclosure.

FIG. 10 shows a simplified computer system 1000, according to some embodiments of the present disclosure. A computer system 1000 as illustrated in FIG. 10 may be incorporated into devices such as a portable electronic device, mobile phone, or other device as described herein. FIG. 10 provides a schematic illustration of one embodiment of a computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

The computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1030 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1030. In other embodiments, a portable electronic device, e.g. the first electronic device, may be incorporated into the computer system 1000, e.g., an electronic device as an input device 1015. In some embodiments, the computer system 1000 will further comprise a working memory 1035, which can include a RAM or ROM device, as described above.

The computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the procedures of such methods are performed by the computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
   obtaining a plurality of genealogical trees, each of the plurality of genealogical trees comprising a plurality of interconnected nodes representing individuals that are related to each other;
   identifying one or more genealogical trees of the plurality of genealogical trees that contain a version of a same person, wherein two different individuals in two different genealogical trees are determined to be versions of the same person based on a comparison between the two different individuals and a first similarity threshold;
   creating a cluster comprising each of the versions of the same person in each of the identified one or more genealogical trees which exceed the first similarity threshold, wherein the cluster combines information from each of the versions of the same person;
   determining a first level of a second similarity threshold, the second similarity threshold relating to a similarity between the versions of the same person;
   creating a cluster view person from the cluster according to the first level of the second similarity threshold, wherein the cluster view person of the cluster includes a first quantity of the versions of the same person;
   increasing the second similarity threshold to a second level based on end user input; and
   adjusting the cluster view person of the cluster according to the second level of the second similarity threshold, wherein the adjusted cluster view of the cluster includes a second quantity of the versions of the same person that is less than the first quantity of the versions of the same person;
   wherein at least one of the first and second similarity thresholds comprises one or more of a score or a quality.

2. The computer-implemented method of claim 1, wherein the combined information from each of the versions of the same person includes one or more of the following: a name, a gender, a date of birth, a location of birth, a date of death, and a location of death.

3. The computer-implemented method of claim 1, further comprising:
   determining a statistic of the combined information from each of the versions of the same person.

4. The computer-implemented method of claim 3, wherein the cluster view of the cluster includes the statistic.

5. The computer-implemented method of claim 1, further comprising:
   ranking the combined information from each of the versions of the same person from most frequent to least frequent.

6. The computer-implemented method of claim 1, wherein the second similarity threshold is increased by an end user.

7. The computer-implemented method of claim 1, wherein the second similarity threshold is automatically increased by a processor.

8. The computer-implemented method of claim 1, wherein the score indicates a similarity between the tree person and other tree persons in the cluster.

9. The computer-implemented method of claim 1, wherein the quality indicates one or more of the quantity or quality of historical records in support of information pertaining to a tree person.

10. The computer-implemented method of claim 9, wherein the quality is proportional to a number of the historical records supporting the tree person.

11. The computer-implemented method of claim 8, wherein the score is inversely proportional to a distance between the tree person and a centroid of all the tree persons in a corresponding cluster.

12. A non-transitory computer readable storage media comprising instructions that, when executed by one or more processors, cause the one or more processors to perform operations comprising:
   obtaining a plurality of genealogical trees, each of the plurality of genealogical trees comprising a plurality of interconnected nodes representing individuals that are related to each other;
   identifying one or more genealogical trees of the plurality of genealogical trees that contain a version of a same person, wherein two different individuals in two different genealogical trees are determined to be versions of the same person based on a comparison between the two different individuals and a first similarity threshold;
   creating a cluster comprising each of the versions of the same person in each of the identified one or more genealogical trees which exceed the first similarity threshold, wherein the cluster combines information from each of the versions of the same person;
   determining a first level of a second similarity threshold, the second similarity threshold relating to a similarity between the versions of the same person;
   customizing creating a cluster view of the cluster according to the first level of the second similarity threshold, wherein the cluster view of the cluster includes a first quantity of the versions of the same person;
   increasing the second similarity threshold to a second level based on end user input; and
   adjusting the cluster view of the cluster according to the second level of the second similarity threshold, wherein the adjusted cluster view of the cluster includes a second quantity of the versions of the same person that is less than the first quantity of the versions of the same person;

wherein at least one of the first and second similarity thresholds comprises one or more of a score or a quality.

13. The non-transitory computer readable storage media of claim 12, wherein the combined information from each of the versions of the same person includes one or more of the following: a name, a gender, a date of birth, a location of birth, a date of death, and a location of death.

14. The non-transitory computer readable storage media of claim 12, wherein the operations further comprise:
determining a statistic of the combined information from each of the versions of the same person.

15. The non-transitory computer readable storage media of claim 14, wherein the cluster view of the cluster includes the statistic.

16. The non-transitory computer readable storage media of claim 12, wherein the operations further comprise:
ranking the combined information from each of the versions of the same person from most frequent to least frequent.

17. The non-transitory computer readable storage media of claim 12, wherein the second similarity threshold is automatically increased by the one or more processors.

18. A system comprising:
one or more processors; and
one or more computer readable storage mediums comprising instructions that, when executed by the one or more processors, cause the one or more processors to perform operations comprising:
obtaining a plurality of genealogical trees, each of the plurality of genealogical trees comprising a plurality of interconnected nodes representing individuals that are related to each other;
identifying one or more genealogical trees of the plurality of genealogical trees that contain a version of a same person, wherein two different individuals in two different genealogical trees are determined to be versions of the same person based on a comparison between the two different individuals and a first similarity threshold;
creating a cluster comprising each of the versions of the same person in each of the identified one or more genealogical trees which exceed the first similarity threshold, wherein the cluster combines information from each of the versions of the same person;
determining a first level of a second similarity threshold, the second similarity threshold relating to a similarity between the versions of the same person;
creating a cluster view of the aggregate individual cluster according to the first level of the second similarity threshold, wherein the cluster view of the cluster includes a first quantity of the versions of the same person;
increasing the second similarity threshold to a second level based on end user input; and
adjusting the cluster view of the cluster according to the second level of the second similarity threshold, wherein the adjusted cluster view of the cluster includes a second quantity of the versions of the same person that is less than the first quantity of the versions of the same person;
wherein at least one of the first and second similarity threshold comprises one or more of a score or a quality.

19. The system of claim 18, wherein the combined information from each of the versions of the same person includes one or more of the following: a name, a gender, a date of birth, a location of birth, a date of death, and a location of death.

20. The system of claim 18, wherein the operations further comprise:
determining a statistic of the combined information from each of the versions of the same person;
wherein the cluster view of the cluster includes the statistic.

* * * * *